United States Patent
Schnoebelen et al.

(10) Patent No.: US 11,885,770 B2
(45) Date of Patent: Jan. 30, 2024

(54) MEASUREMENT PROBE EDGE GUIDE TOOL

(71) Applicant: The Boeing Company, Chicago, IL (US)

(72) Inventors: Nicholas J. Schnoebelen, Adams, IA (US); Wallace Kwan, Seattle, WA (US); Brandon J. Steffensmeier, Cedar Rapids, IA (US); Luis A. Perla, Sammamish, WA (US); Erika L. Berhardt, Decatur, IL (US); John R. Aubin, Seattle, WA (US)

(73) Assignee: The Boeing Company, Arlington, VA (US)

( * ) Notice: Subject to any disclaimer, the term of this patent is extended or adjusted under 35 U.S.C. 154(b) by 308 days.

(21) Appl. No.: 17/470,264

(22) Filed: Sep. 9, 2021

(65) Prior Publication Data
US 2022/0236231 A1    Jul. 28, 2022

Related U.S. Application Data

(60) Provisional application No. 63/142,135, filed on Jan. 27, 2021.

(51) Int. Cl.
*G01N 29/24* (2006.01)
*G01N 29/04* (2006.01)
*G01N 29/22* (2006.01)

(52) U.S. Cl.
CPC ............. *G01N 29/24* (2013.01); *G01N 29/04* (2013.01); *G01N 29/225* (2013.01); *G01N 2291/101* (2013.01); *G01N 2291/269* (2013.01)

(58) Field of Classification Search
CPC ...... G01N 29/24; G01N 29/04; G01N 29/225; G01N 29/246; G01N 29/265; G01N 29/28; G01N 29/68; G01N 2291/101; G01N 2291/269
USPC .......................................................... 73/596
See application file for complete search history.

(56) References Cited

U.S. PATENT DOCUMENTS

| | | | | |
|---|---|---|---|---|
| 4,481,814 A | * | 11/1984 | Wentzell | F16H 55/02 73/866.5 |
| 5,910,894 A | * | 6/1999 | Pryor | G05B 19/41875 700/95 |
| 6,044,308 A | * | 3/2000 | Huissoon | B25J 9/1692 700/254 |
| 6,537,223 B1 | * | 3/2003 | Kristiansen | G01F 1/662 600/459 |

(Continued)

*Primary Examiner* — Jacques M Saint Surin
(74) *Attorney, Agent, or Firm* — Ostrager Chong Flaherty & Broitman P.C.

(57) ABSTRACT

A measurement probe edge guide tool includes an edge follower comprising two edge contact pins that spin around the outside of the measurement probe using a ball bearing. The edge contact pins hug the corner of a contoured edge of the workpiece or in-service part to provide a consistent distance of the center of the probe from the edge. The edge follower enables the tool to inspect the marginal portion bounded by a contoured (machined) edge of a workpiece or part. The edge follower is removable so that the tool may also be adapted for use in general acreage inspection. The tool features a spring-loaded mechanism with a positive probe protrusion relative to a roller-supported cage. The tool has either a handle which is coupled to the cage by means of a universal joint or a hand grip that is affixed to the cage.

20 Claims, 17 Drawing Sheets

(56) References Cited

U.S. PATENT DOCUMENTS

| | | |
|---|---|---|
| 6,637,266 B1 | 10/2003 | Froom |
| 7,015,473 B2 | 3/2006 | Harding et al. |
| 8,092,311 B2 | 1/2012 | Kruppa |
| 8,347,746 B2 * | 1/2013 | Hafenrichter ....... G01M 5/0016 73/866.5 |
| 8,556,735 B1 | 10/2013 | Dorfman et al. |
| 8,616,062 B2 | 12/2013 | Kono et al. |
| 8,983,794 B1 | 3/2015 | Motzer et al. |
| 2003/0048459 A1 | 3/2003 | Gooch |
| 2010/0228506 A1 | 9/2010 | Motzer et al. |

\* cited by examiner

MEASUREMENT PROBE EDGE GUIDE TOOL

RELATED PATENT APPLICATION

This application claims the benefit, under Title 35, United States Code, Section 119(e), of U.S. Provisional Application No. 63/142,135 filed on Jan. 27, 2021.

BACKGROUND

The present disclosure relates generally to probes for measuring properties of workpieces or in-service parts and, more specifically, to measurement probes designed to measure properties of marginal portions of workpieces or parts which are bounded by a contoured edge.

The traditional method of using an ultrasonic transducer for performing manual hand scans around machined edges involves holding the transducer in a pinch grip between the index finger and thumb, while using the middle finger as a guide against the edge to act as a rail. Existing transducer holders utilize a spring-loaded mechanism, but with a negative protrusion of the transducer that requires the operator to "push" the transducer onto the material within a cage. The cage has a flat contact surface which opens the potential to friction-induced wear and adversely affected performance. The existing tool also has a way to hook onto an edge of the workpiece or part, making it possible for the transducer to lose stability if the cage extends too far off the edge of the workpiece or part.

SUMMARY

The subject matter disclosed in detail below is directed to a measurement probe edge guide tool that is designed to overcome one or more of the above-described issues associated with an existing probe holder. The measurement probe edge guide tool uses an edge follower comprising two edge contact pins that spin around the outside of the measurement probe using a ball bearing to hug the corner of a contoured edge of the workpiece or in-service part while providing a consistent distance of the center of the probe from the edge. The edge follower enables the tool to inspect the marginal portion bounded by a contoured (machined) edge of a workpiece or part. However, the edge follower is removable so that the tool may also be adapted for use in general acreage inspection.

The tool proposed herein features a spring-loaded mechanism with a positive probe protrusion relative to a roller-supported cage, which feature enables the user to push the cage against the surface of the workpiece or part being measured rather than applying force directly to the measurement probe. The spring-loaded mechanism includes a spring chamber-defining part that is affixed to the plastic cage by means of heat-set threaded inserts and bolts. The positive protrusion of the probe (e.g., an ultrasonic transducer) enables the contact portion of the probe (e.g., the delay line of an ultrasonic transducer) to be in constant contact with a normal orientation relative to the plane of the surface being scanned for the duration of the scan without active effort by the user.

In accordance with one embodiment, the tool has a handle which is coupled to the cage by means of a universal joint. The universal joint enables the user to reduce wrist and finger strain by reducing the bending of the wrist when going around corners and eliminating the pinch grip associated with using a transducer by itself. The universal joint improves the ergonomics of manual non-destructive inspection of a marginal portion along the contoured edge of a workpiece or part. Besides enhancing safety, the adaptability of the tool proposed herein allows the user to perform scans with one sweeping motion and reduces the amount of time dedicated to readjustment.

Although various embodiments of measurement probe edge guide tools are described in some detail below, one or more of those embodiments may be characterized by one or more of the following aspects.

One aspect of the subject matter disclosed in detail below is a tool comprising: a cage comprising upper and lower parts and interconnecting structure that connects the upper parts to the lower parts; a measurement probe configured to measure a property of a workpiece or part; a probe retainer configured to retain the measurement probe in a vertical orientation, the probe retainer being translatable relative to the cage in directions parallel to a tool vertical axis; and an edge follower that is rotatable relative to the cage about the tool vertical axis. The edge follower comprises: a ring that encircles a portion of the measurement probe; and first and second edge contact pins that are connected to and project downward from the ring.

In accordance with one embodiment, the tool described in the immediately preceding paragraph further comprises: a socket ring affixed to the cage and comprising a plurality of sockets; and a plurality of balls respectively disposed in and protruding from the plurality of sockets.

In accordance with one proposed implementation, the ring of the edge follower comprises an inner race having an outer circumferential circular groove, and the tool further comprises: a bearing adapter that is affixed to the cage and comprises an inner circumferential circular groove; and a plurality of rolling elements contained by the inner and outer circumferential circular grooves.

In accordance with some embodiments, the tool further comprises: a universal joint comprising a U-joint hub having first and second axes, a first U-joint yoke rotatably coupled to the U-joint hub for rotation about the first axis, and a second U-joint yoke rotatably coupled to the U-joint hub for rotation about the second axis, wherein the second U-joint yoke is affixed to an upper part of the cage; and a handle affixed to the first U-joint yoke. In accordance with other embodiments, the tool further comprises a hand grip affixed to an upper part of the cage.

Another aspect of the subject matter disclosed in detail below is a tool comprising: a cage comprising an upper ring, a lower ring, and a plurality of beams connecting the upper ring to the lower ring; a socket ring affixed to the lower ring of the cage and comprising a plurality of sockets; a plurality of balls respectively arranged in the plurality of sockets and protruding below a plane of a bottom surface of the socket ring; a measurement probe having a contact portion; a plunger/retainer subassembly that retains the measurement probe in a central position relative to the cage, the plunger/retainer subassembly being displaceable relative to the cage from a starting position at which the contact portion of the measurement probe projects downward and lower than the cage; a rolling-element bearing comprising inner and outer races and a plurality of rolling elements contained by the inner and outer races, the inner and outer races being disposed between the measurement probe and the lower ring of the cage, the outer race being fixed, and the inner race being rotatable relative to the cage; and first and second edge contact pins that are connected to and project downward from the inner race. The tool user is able to measure properties of (e.g., non-destructively inspect) a marginal portion of a workpiece or in-service part by manually moving the tool while maintaining the edge contact pins in contact with an edge of the workpiece or part.

In the alternative, the measurement probe edge guide tool may be reconfigured for general acreage measurement (e.g., inspection) by removing the edge follower. Other aspects of measurement probe edge guide tools are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

Reference will hereinafter be made to the drawings in which similar elements in different drawings bear the same reference numerals.

DETAILED DESCRIPTION

For the purpose of illustration, measurement probe edge guide tools will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
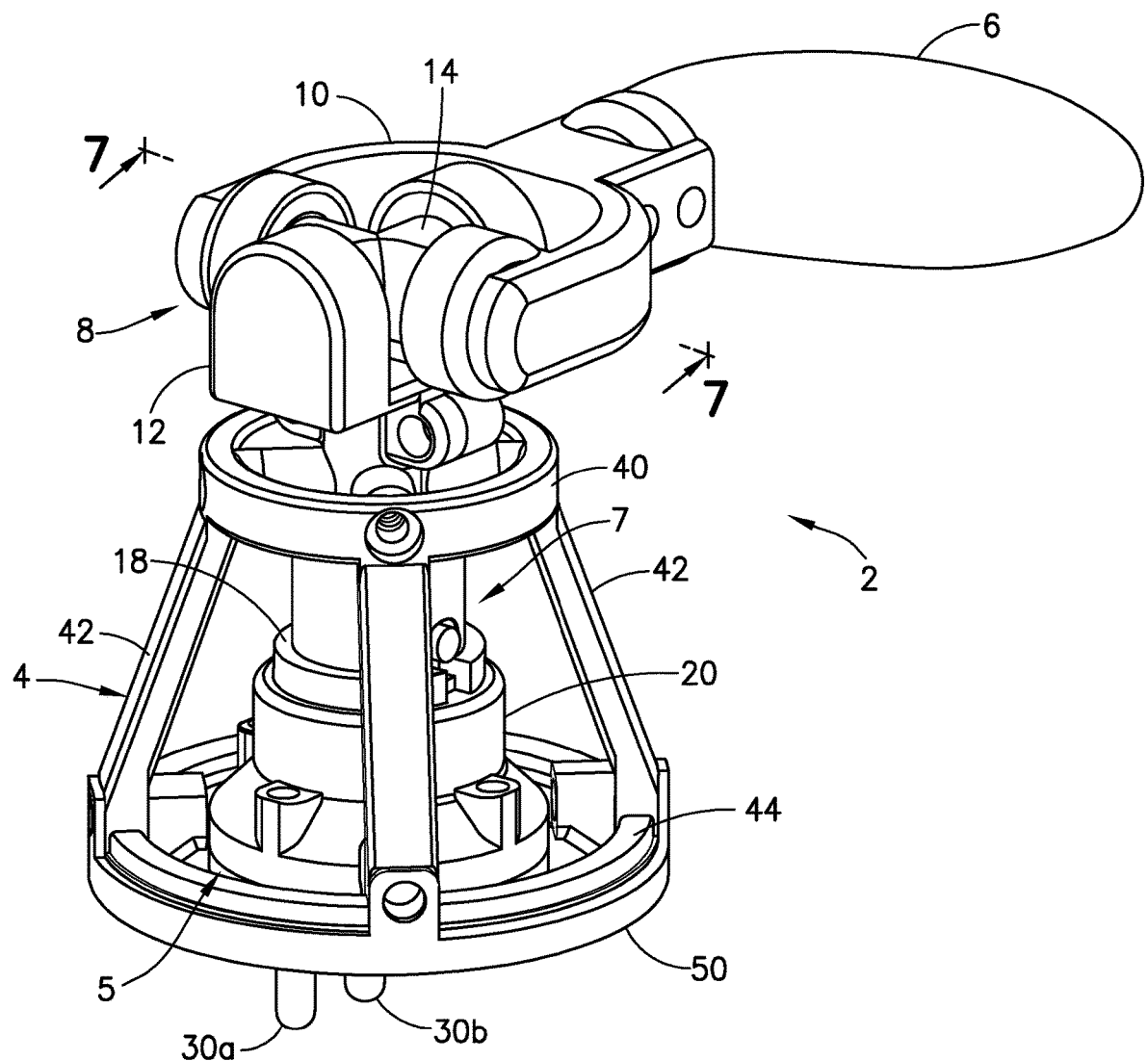
FIG. 1 is a diagram representing a three-dimensional (3-D) view of a measurement probe edge guide tool equipped with a handle that is mechanically coupled to a cage by means of a universal joint in accordance with one embodiment.
Figure 2:
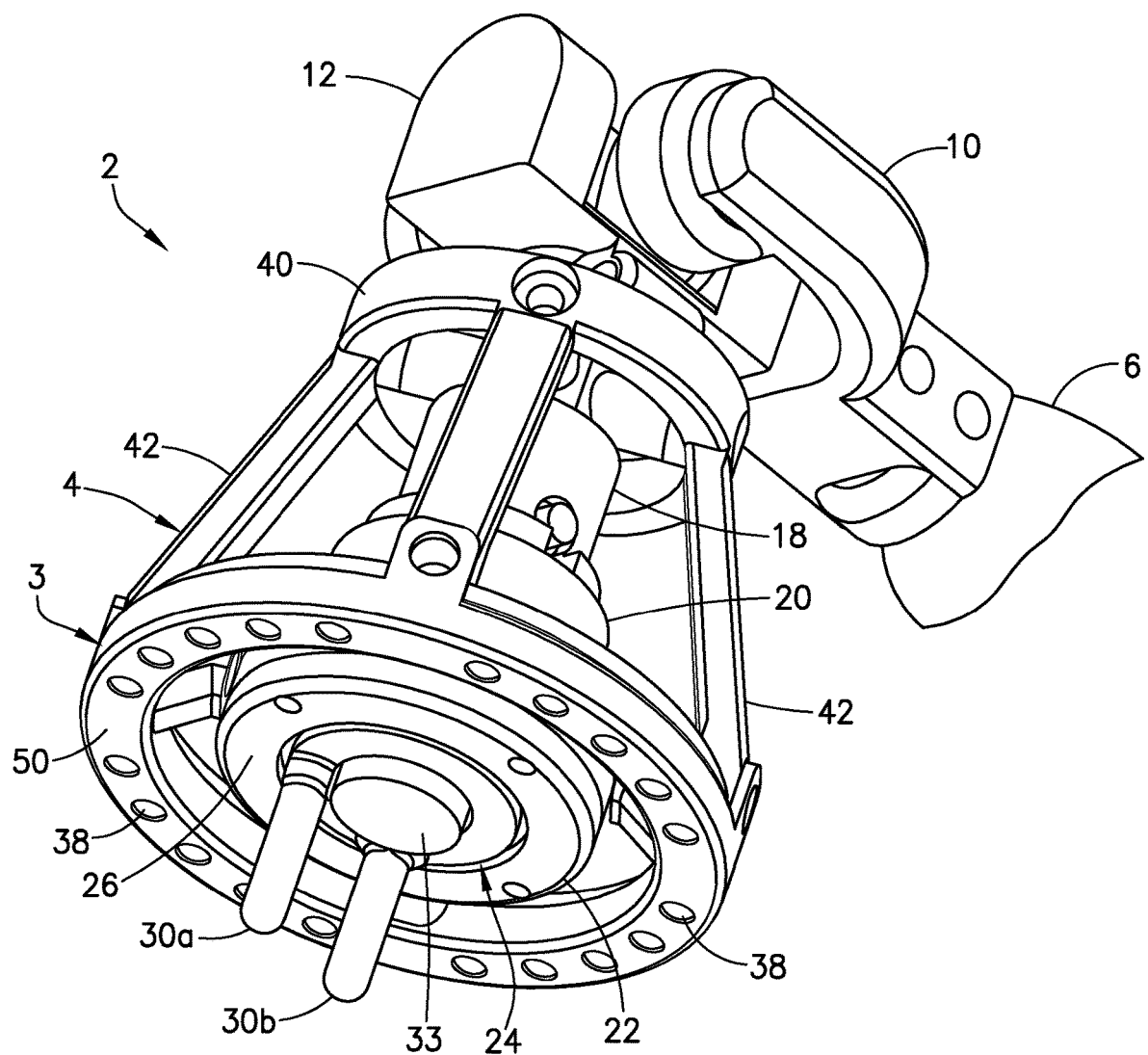
FIG. 2 is a diagram representing another 3-D view of the measurement probe edge guide tool depicted in FIG. 1, but from a different from a different viewpoint.
Figure 3:
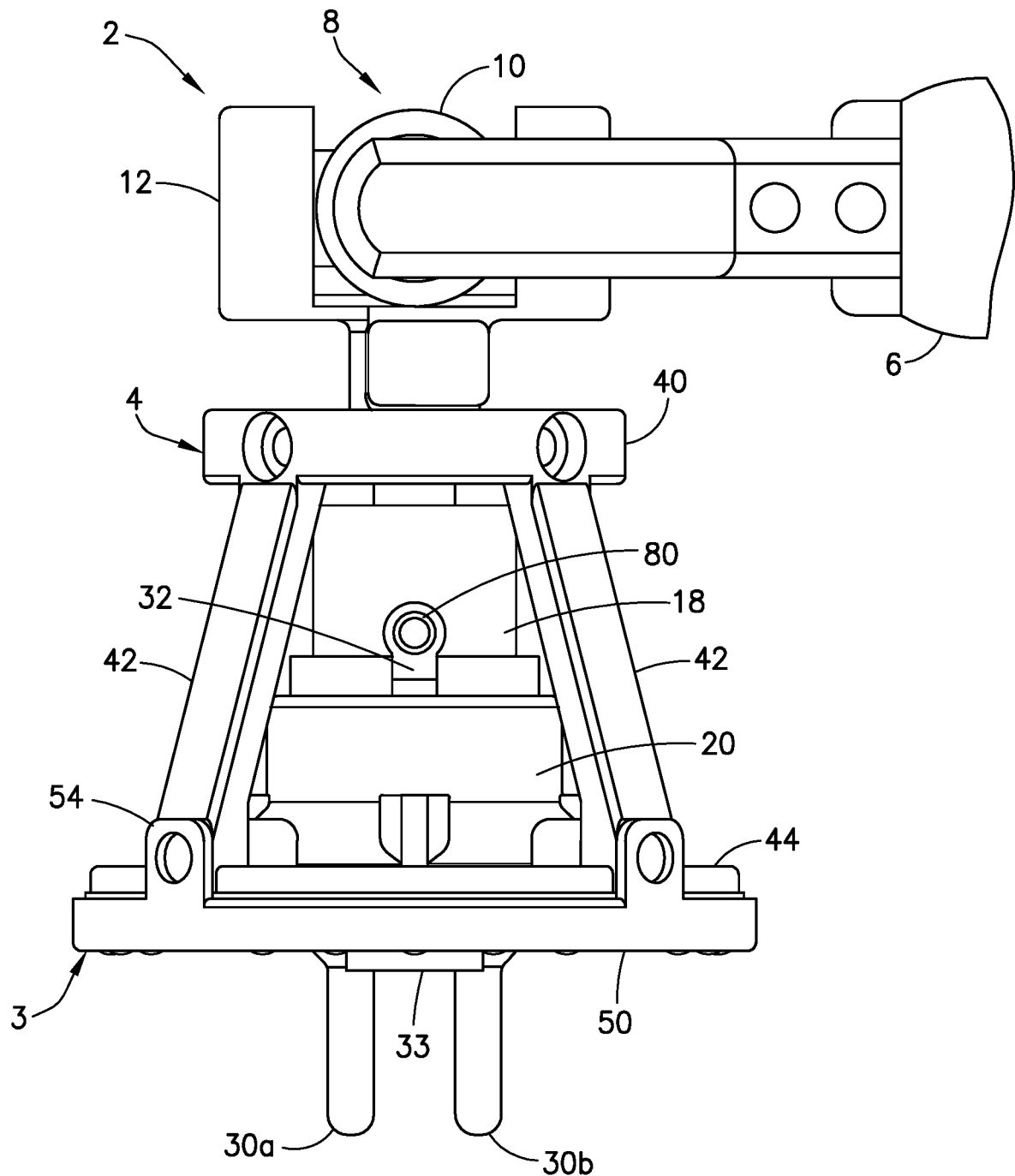
FIGS. 3 through 6 are diagrams representing side, front, top, and bottom views respectively of the measurement probe edge guide tool depicted in FIGS. 1 and 2.
Figure 4:
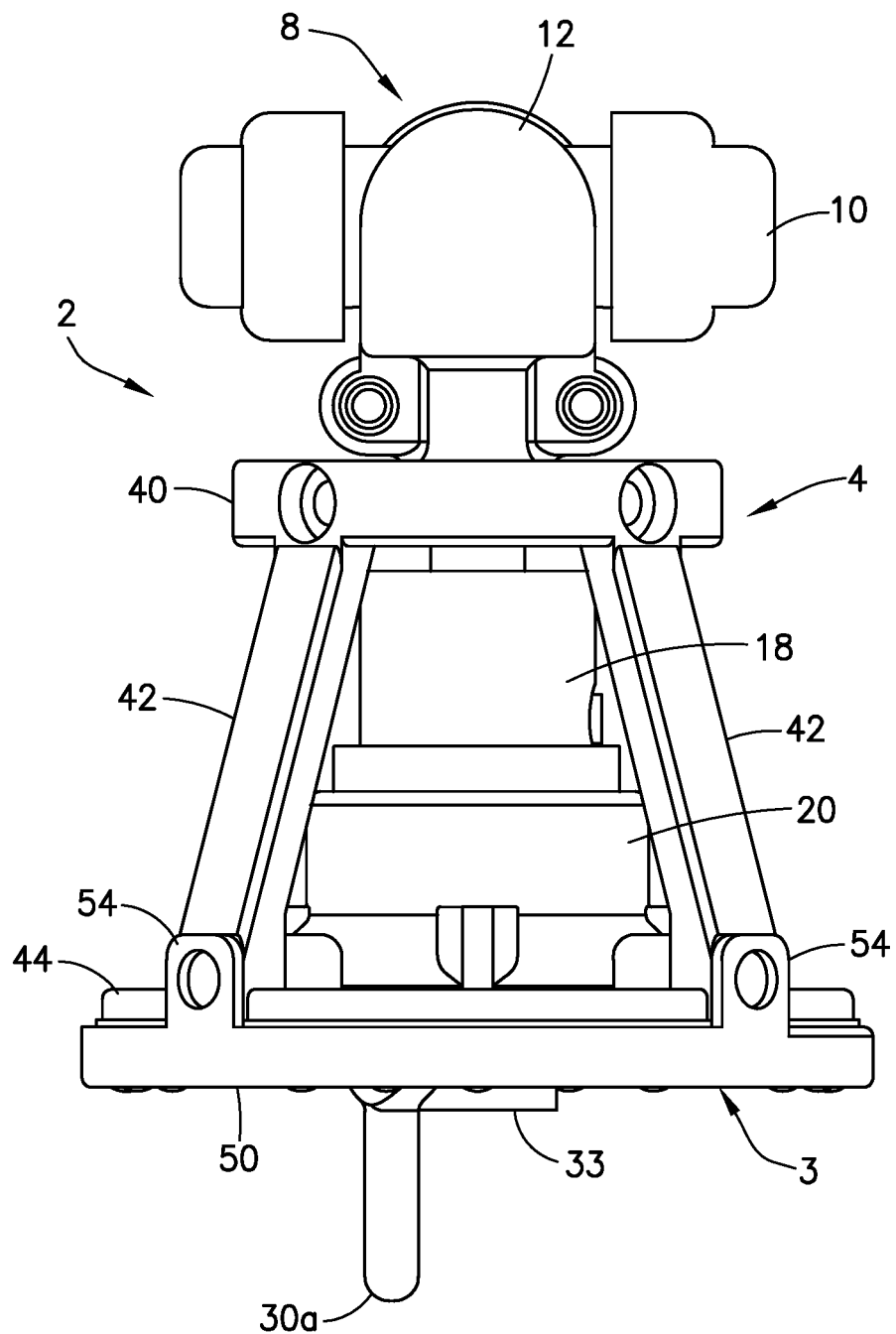
Figure 5:
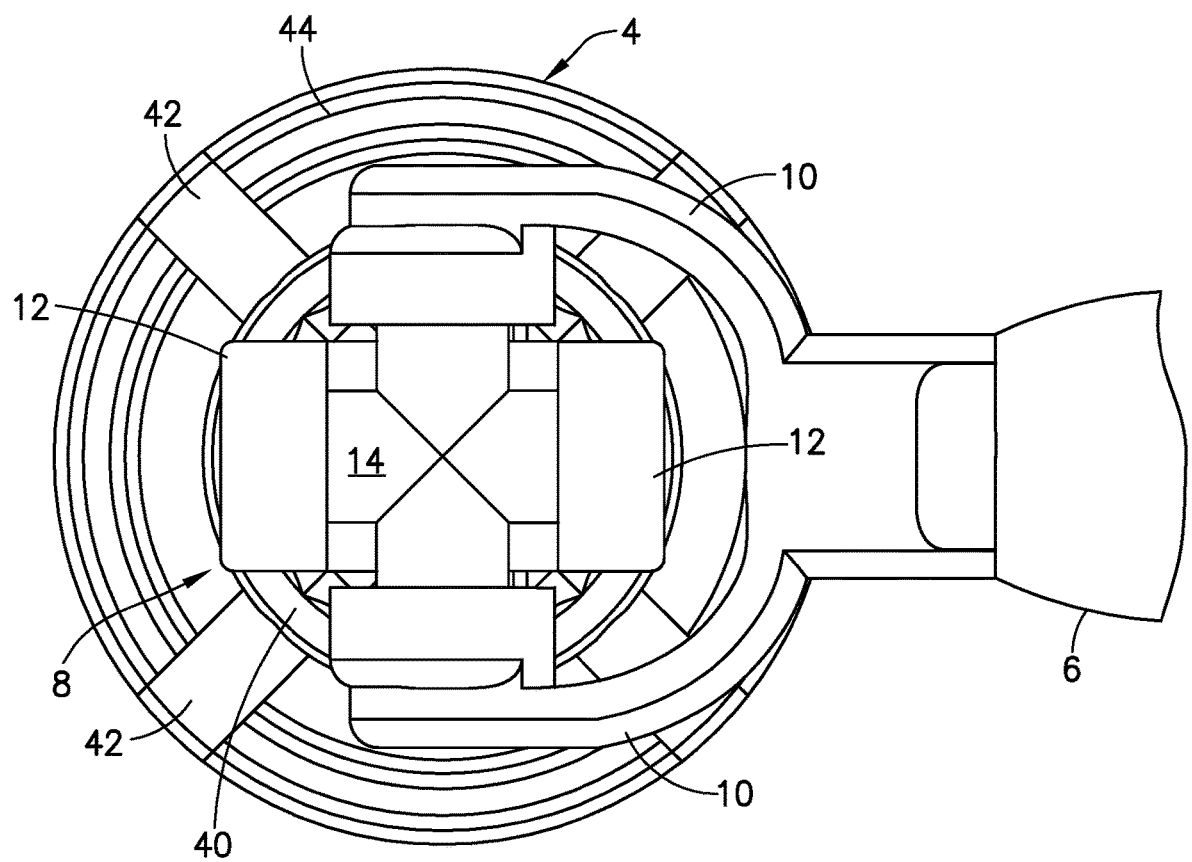
Figure 6:
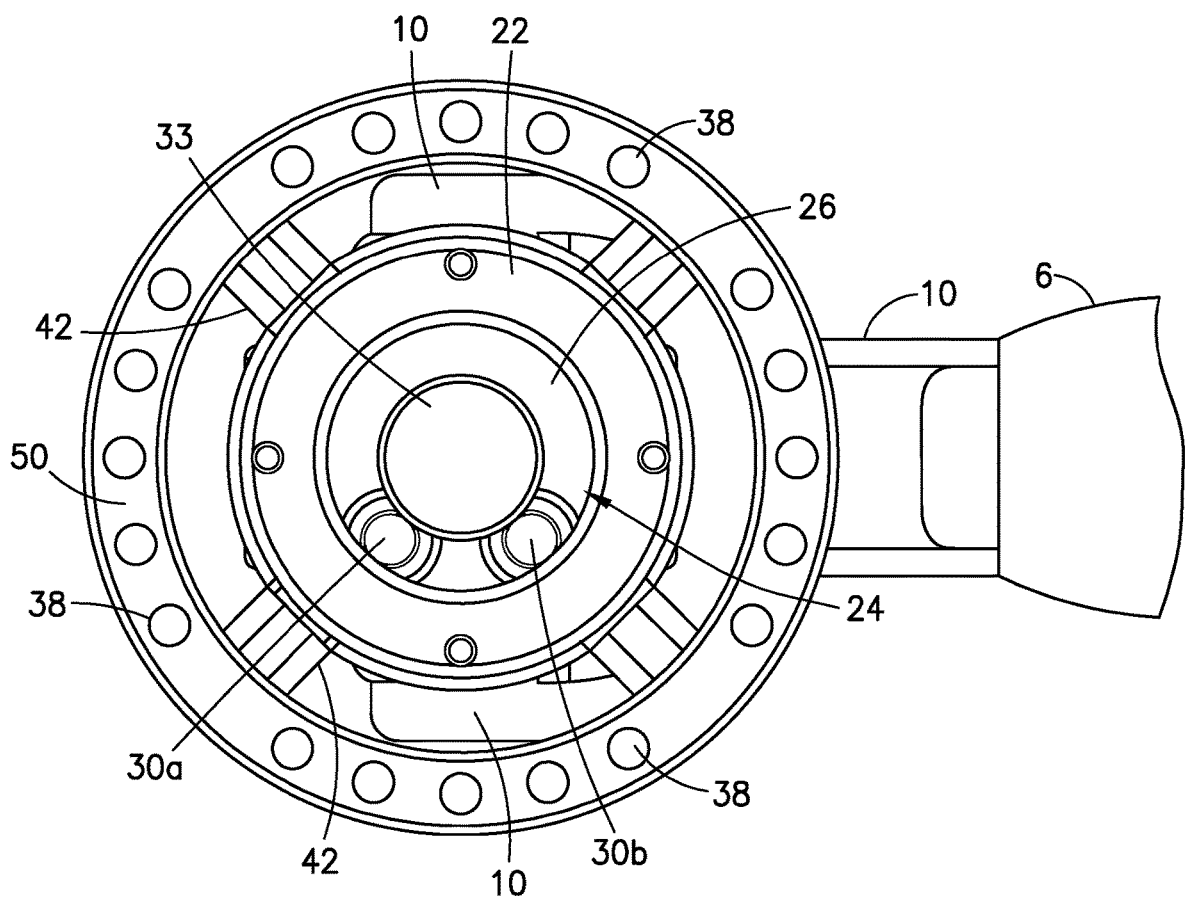
Figure 7:
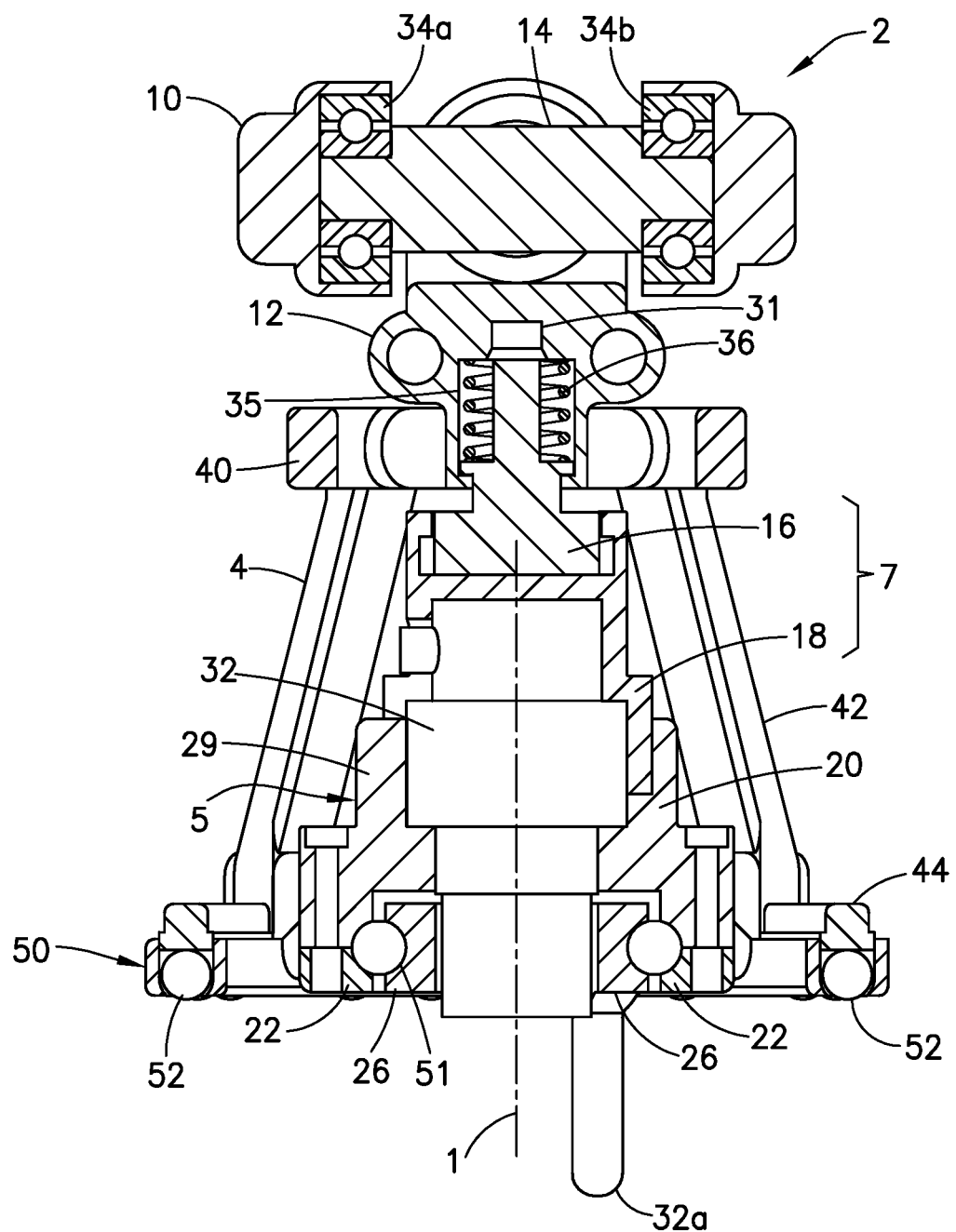
FIG. 7 is a diagram representing a cross-sectional view of the measurement probe edge guide tool depicted in FIGS. 1 and 2, the section being taken along the plane 7-7 indicated in FIG. 1, with the exception of the measurement probe which is not sectioned.
Figure 8:
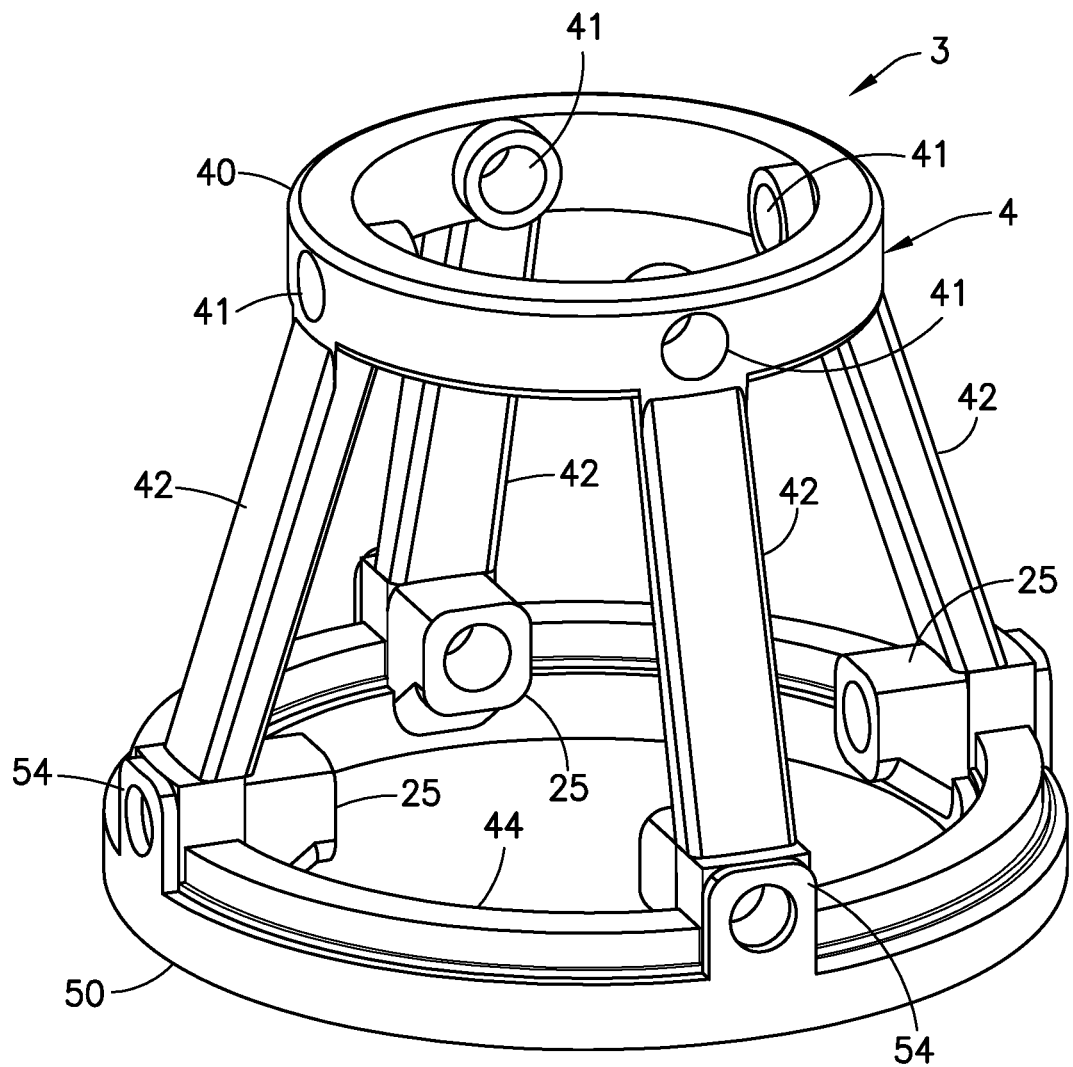
FIG. 8 is a diagram representing a 3-D view of a rolling cage subassembly included in the measurement probe edge guide tool depicted in FIGS. 1-7.

FIGS. 1 and 2 are diagrams representing three-dimensional (3-D) views from different vantage points of a measurement probe edge guide tool 2 (hereinafter "tool 2") in accordance with one embodiment. FIGS. 3 through 6 show side, front, top, and bottom views respectively of the tool 2 depicted in FIGS. 1 and 2. FIG. 7 shows a cross-sectional view of tool 2. FIG. 8 shows a 3-D view of rolling cage subassembly 3 in isolation.

In accordance with the embodiment depicted in FIGS. 1 and 2, the tool 2 is equipped with a handle 6 that is mechanically coupled to a rolling cage subassembly 3 by means of a universal joint 8. The rolling cage subassembly 3 includes a cage 4. The tool further includes a measurement probe (hidden in FIG. 1, but shown in isolation in FIG. 14) which is carried by the rolling cage subassembly 3. A contact portion 33 of the measurement probe is seen protruding from tool 2 in FIG. 2. (As used herein, the term "contact portion" means the portion of the measurement probe that contacts the surface of the workpiece or part during an inspection procedure.)

As seen in FIG. 2, the tool 2 further includes an edge follower 24 comprising two edge contact pins 30a and 30b that spin around the outside of the contact portion 33 of the measurement probe to hug the corner of a contoured edge of a workpiece or in-service part. As the edge contact pins 30a and 30b are pressed against the contoured edge of the workpiece or part, the edge follower 24 rotates about an axis of rotation. (The convention is adopted herein that the axis of rotation of the edge follower 24 is the tool vertical axis 1 which is depicted in FIG. 7.) The edge follower 24 enables the tool 2 to inspect a marginal portion of a workpiece or part which extends along a contoured (machined) edge by maintaining the center of the measurement probe at a consistent distance from the edge.

As previously mentioned, tool 2 includes a handle 6 which is coupled to the cage 4 by means of a universal joint 8. Referring again to FIG. 1, the universal joint 8 includes a U-joint hub 14, a first U-joint yoke 10 rotatably coupled to the U-joint hub 14 for rotation about a first axis, and a second U-joint yoke 12 rotatably coupled to the U-joint hub 14 for rotation about a second axis. In one proposed implementation shown in FIG. 5, the first and second axes of the U-joint hub 14 are mutually orthogonal. The handle 6 is affixed to the first U-joint yoke 10. The second U-joint yoke 12 is affixed to the upper part 40 of the cage 4. Thus, the rolling cage subassembly 3 is rotatable relative to first U-joint yoke 10 about the first and second axes. The universal joint 8 enables the user to reduce wrist and finger strain by reducing the bending of the wrist when going around corners, thereby improving the ergonomics of manual non-destructive inspection of a marginal portion along a contoured edge of a workpiece or part.

As best seen in FIG. 8, the rolling cage subassembly 3 includes the cage 4 and a socket ring 50 which is affixed to the cage 4. The cage 4 comprises an upper part 40, a lower part 44, and interconnecting structure 42 which connecting the upper part 40 to the lower part 44. In accordance with the proposed implementation depicted in FIG. 8, the upper part 40 and lower part 44 are circular rings, while the interconnecting structure 42 includes four beams. However, a person skilled in the art will appreciate that the upper and lower parts of cage 4 need not be circular. For example, the upper and lower parts of cage 4 may be square.

As seen in FIG. 8, socket ring 50 is disposed directly underneath and has a geometry that matches the geometry of lower part 44 of cage 4. The socket ring 50 comprises four mounting brackets 54 which are fastened to cage 4 in four places using heat-set threaded inserts and bolts (not shown in the drawings). The threaded inserts are installed inside bores formed in bosses 25 of cage 4, which is made of plastic material. The bolts are threadably coupled to the threaded inserts for fastening the socket ring 50 to cage 4.

Figure 17:
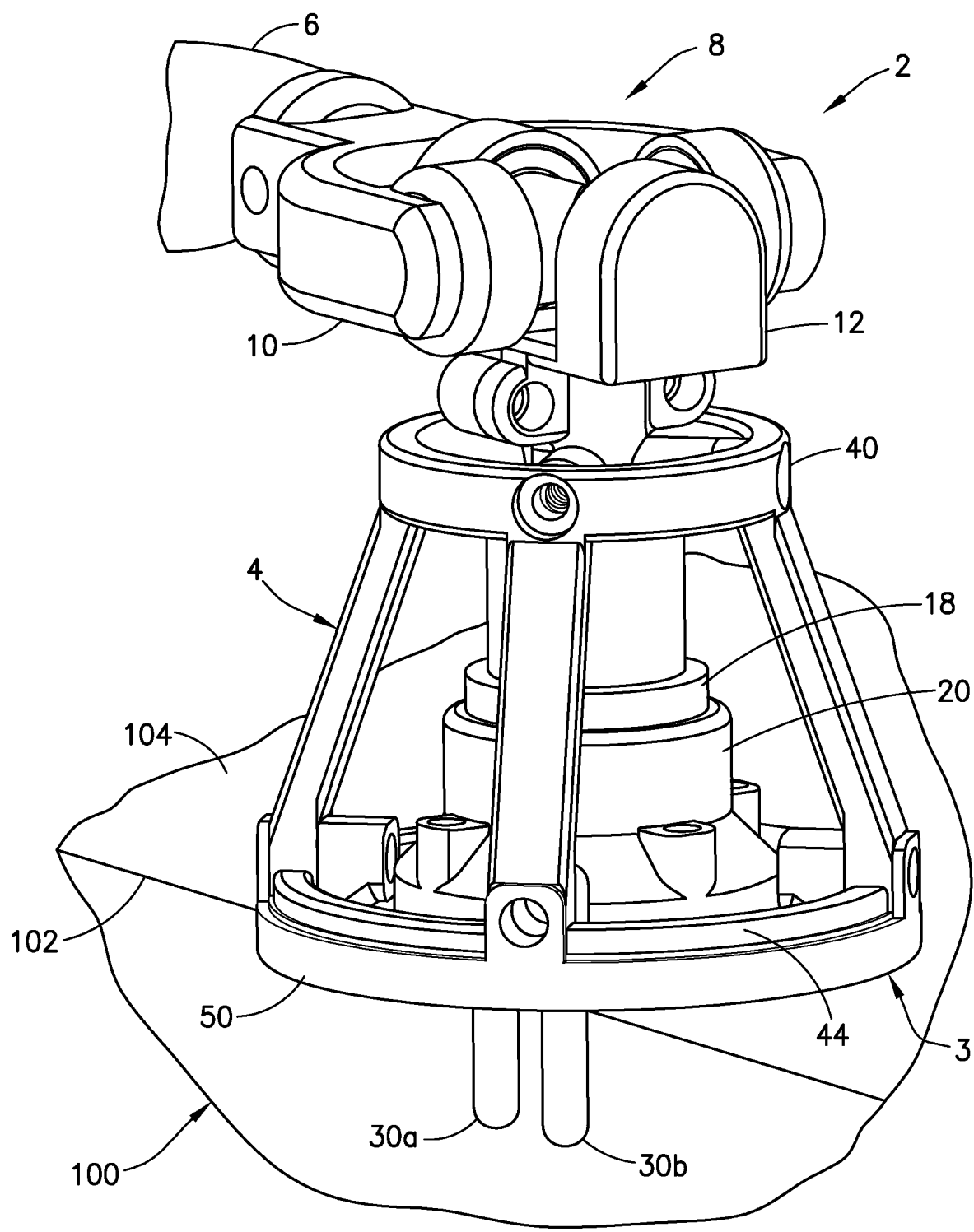
FIG. 17 is a diagram representing a 3-D view of a measurement probe edge guide tool having two edge contact pins in contact with the edge of a workpiece while a major portion of a rolling cage is seated on the surface of the workpiece and a minor portion of the rolling cage projects beyond the edge of the workpiece.

As seen in FIG. 2, the socket ring 50 has a plurality of sockets 38 which receive respective balls (not shown in FIG. 2, but see balls 52 in FIG. 7). The rolling cage subassembly 3 is able to move across a surface of a workpiece or part (as depicted in FIG. 17) by rolling on those balls.

Referring again to FIG. 1, the tool 2 further includes a bearing adapter 5 and a plunger/retainer subassembly 7. Only portions of the bearing adapter 5 and plunger/retainer subassembly 7 are visible in FIGS. 1 and 2. The individual components of bearing adapter 5 and plunger/retainer subassembly 7 are described in detail below with reference to FIGS. 12-16. The bearing adapter 5 is affixed to and carried by the rolling cage subassembly 3. The plunger/retainer subassembly 7 is slidably coupled to the bearing adapter 5 for relative translation up and down along the tool vertical axis.

The tool 2 further includes a measurement probe which is not visible in FIG. 1 because one part of the probe is retained inside plunger/retainer subassembly 7 while another part of the probe is slidable inside the bearing adapter 5. The measurement probe is held in an upright (vertical) position by the bearing adapter 5 and the plunger/retainer subassembly 7. The plunger/retainer subassembly 7 includes a probe retainer 18 (shown in isolation in and described in detail below with reference to FIG. 13) that is slidably coupled to bearing adapter 5 in a manner that allows probe retainer 18 to slide in a direction parallel to the tool vertical axis (not indicated in FIG. 1, but see tool vertical axis 1 in FIG. 7) while the bearing adapter remains stationary. More specifically, the plunger/retainer subassembly 7 is vertically displaceable relative to bearing adapter 5.

The bearing adapter 5 and the probe retainer 18 are configured to receive respective portions of the measurement probe. The measurement probe is also vertically displaceable relative to the bearing adapter 5 between extended and retracted positions. In the extended position, the contact portion 33 of the measurement probe protrudes from tool 2 as shown in FIG. 2. The contact portion 33 is retracted (displaced upward) when tool 2 is placed in contact with the surface of the workpiece.

The tool 2 is partially sectioned to reveal the measurement probe 32 in FIG. 7. Referring to FIG. 7, the bearing adapter 5 includes an upper bearing adapter part 20 and a lower bearing adapter part 20 which are fastened together, while the plunger/retainer subassembly 7 includes a plunger 16 and a probe retainer 18 which are coupled by twist-locking. The probe retainer 18 is slidably coupled to the upper bearing adapter part 20, which is fixed relative to cage 4. Thus, plunger 16, probe retainer 18, and measurement probe 32 are vertically translatable in tandem along the tool vertical axis.

More specifically, the measurement probe 32 is vertically translatable between the extended position seen in FIG. 7 and a retracted position. The measurement probe 32 is urged toward the extended position by a spring 36 which interacts with plunger 16. In the extended position seen in FIG. 7, the contact portion 33 of measurement probe 32 protrudes below the socket ring 50. However, when the rolling cage subassembly 3 is placed on a surface, that surface presses against the contact portion 33 of measurement probe 32, causing measurement probe 32 to retract relative to cage 4 until the end face of contact portion 33 is co-planar with a plane defined by the points of contact of balls 52 on the surface (assuming a planar surface for the sake of simplicity).

As best seen in FIG. 7, the spring 36 is seated in a spring chamber 35 formed in a lower portion of the second U-joint yoke 12. The spring chamber 35 communicates with a recess 31. In one proposed implementation, spring chamber 35 is a circular cylindrical cavity having a first radius, whereas recess 31 is a circular cylindrical cavity having a second radius smaller than the first radius. The recess 31 and spring chamber 35 are separated by an intermediate space bounded by a conical surface. The conical surface guides the end of the shaft of plunger 16 into recess 31 during retraction (upward displacement) of the measurement probe 32.

FIG. 7 also shows a pair of ball bearings 34a and 34b which rotatably couple the first U-joint yoke 10 to the U-joint hub 14 to enable the first U-joint yoke 10 to rotate about the first axis of rotation. An identical pair of ball bearings (not visible in FIG. 7) enable the second U-joint yoke 12 to rotate about the second axis of rotation.

Figure 9:
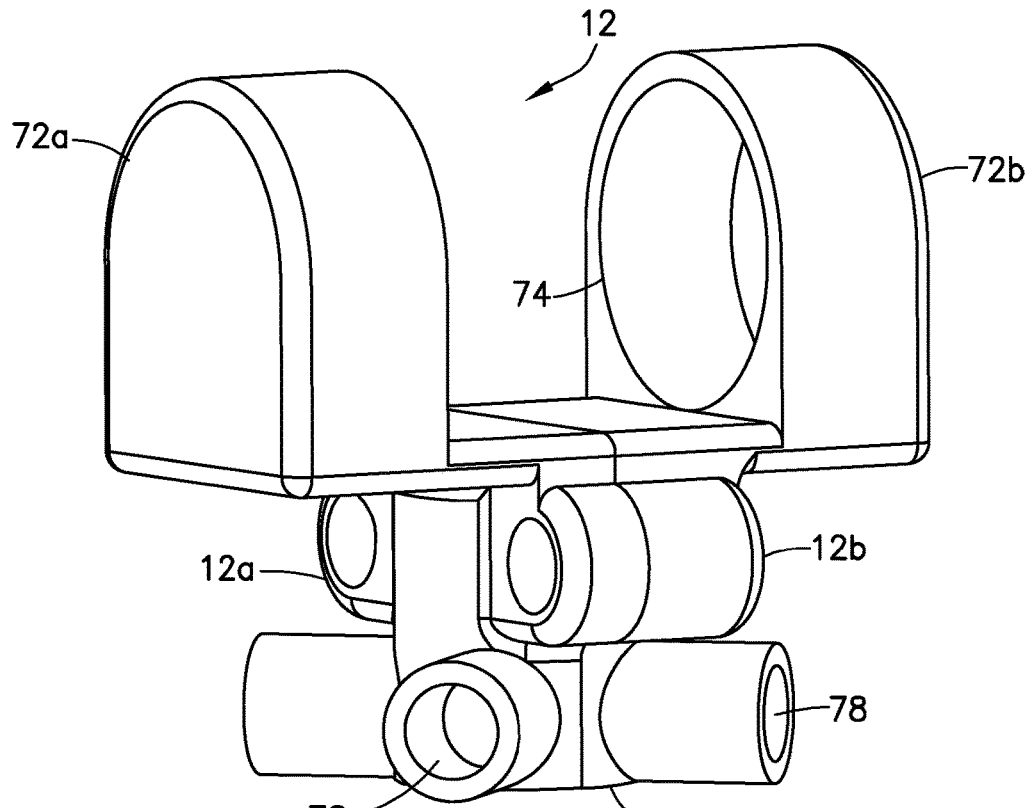
FIG. 9 is a diagram representing a 3-D view of the U-joint yoke with spring chamber included in the measurement probe edge guide tool depicted in FIGS. 1-7.

FIG. 9 shows a 3-D view of the second U-joint yoke 12 in accordance with one proposed implementation of tool 2 depicted in FIGS. 1-7. The spring chamber 35 shown in FIG. 7 is not visible in FIG. 9. The second U-joint yoke 12 consists of two plastic parts 12a and 12b which are fastened together using heat-set threaded inserts and bolts. The threaded inserts are installed inside four bores 78 formed in a mounting crosspiece 76. The four bores 78 align with four bores 41 which are distributed at equiangular intervals around the upper part 40 of cage 4, as seen in FIG. 8. The second U-joint yoke 12 further includes a pair of receptacles 72a and 72b having respective circular cylindrical cavities 74 (only one of which is visible in FIG. 9). A pair of ball bearings (not shown in FIG. 9) may be press fit into the cavities 74 of receptacles 72a and 72b.

Figure 10:
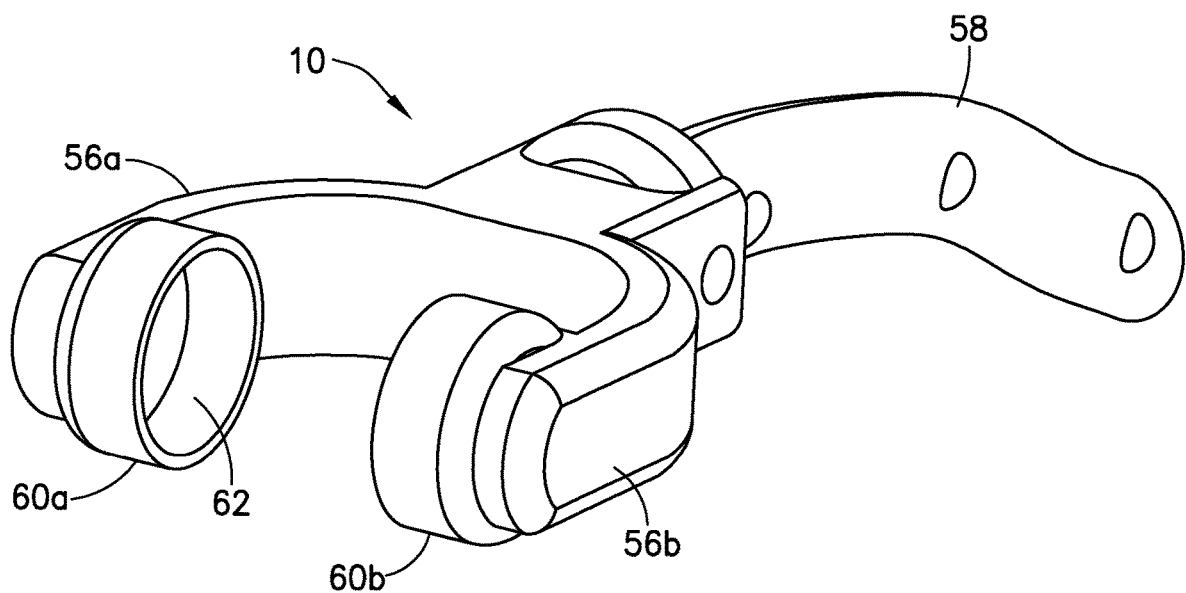
FIG. 10 is a diagram representing a 3-D view of the U-joint yoke with handle spine included in the measurement probe edge guide tool depicted in FIGS. 1-7.

FIG. 10 shows a 3-D view of the first U-joint yoke 10. The first U-joint yoke 10 comprises a pair of yoke arms 56a and 56b and a handle spine 58 to which the handle 6 shown in FIG. 1 is attached. The first U-joint yoke 10 further includes a pair of receptacles 60a and 60b having respective circular cylindrical cavities 62 (only one of which is visible in FIG. 10). The ball bearings 34a and 34b seen in FIG. 7 may be press fit into the cavities 62 of receptacles 60a and 60b.

Figure 11:
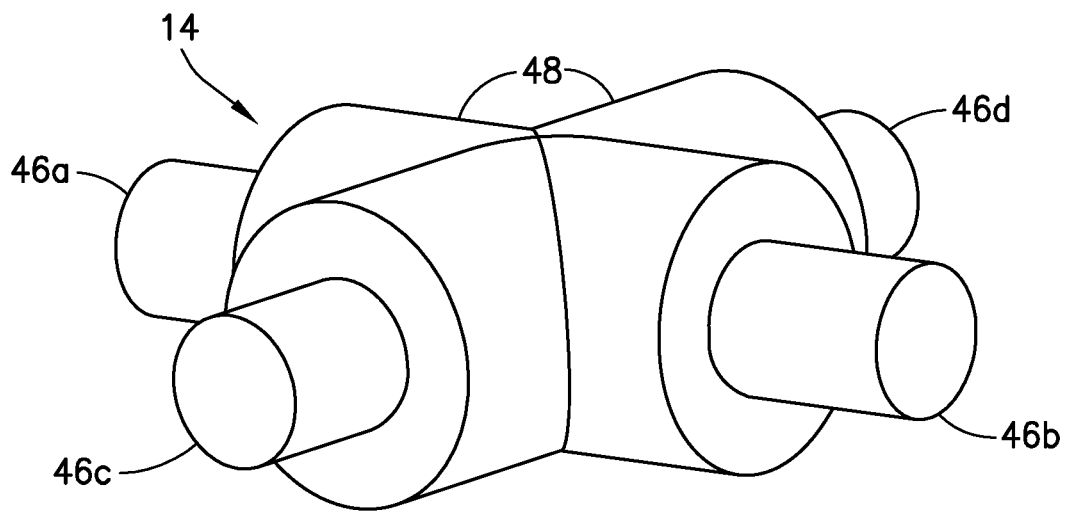
FIG. 11 is a diagram representing a 3-D view of the U-joint hub of the universal joint included in the measurement probe edge guide tool depicted in FIGS. 1-7.

FIG. 11 shows a 3-D view of the U-joint hub 14 of the universal joint 8 depicted in FIG. 1. The U-joint hub 14 includes a spider 48 and two pairs of trunnions 46a-46d. The trunnions 46a-46d may be integrally formed with or attached to respective ends of the spider limbs. In one proposed implementation, trunnions 46a and 46b share a common first axis, while trunnions 46c and 46d share a common second axis which is orthogonal to the first axis. The trunnions 46a and 46b may be press fit into ball bearings which are respectively press fit into the cavities 74 of receptacles 72a and 72b seen in FIG. 9. Likewise the trunnions 46c and 46d may be press fit into ball bearings which are respectively press fit into the cavities 62 of receptacles 60a and 60b seen in FIG. 10.

Figure 12:
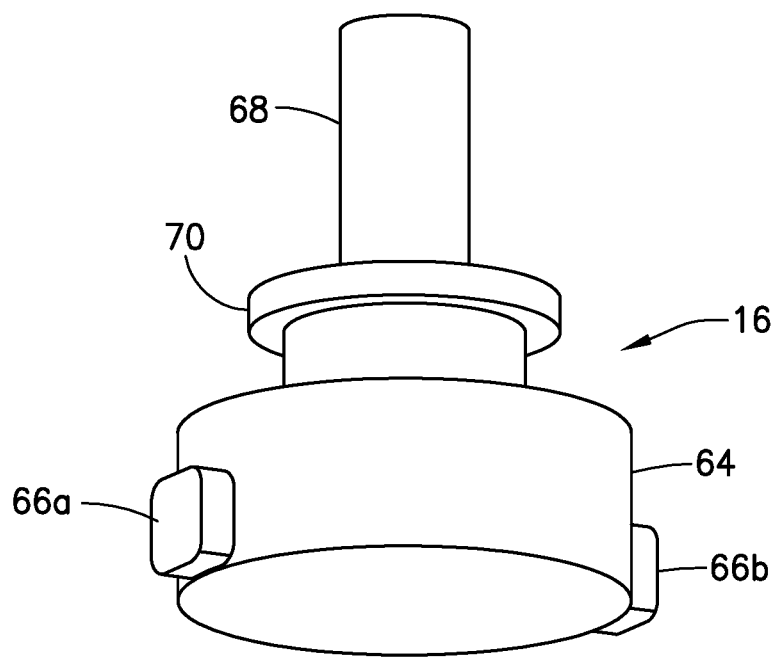
FIG. 12 is a diagram representing a 3-D view of the plunger of the plunger/retainer subassembly included in the measurement probe edge guide tool depicted in FIGS. 1-7.

FIG. 12 shows a 3-D view of the plunger 16 of the plunger/retainer subassembly 7 included in tool 2. The plunger 16 has a base 64, a flange 70, and a shaft 68. The base 64 of plunger 16 is seated in an upper cavity formed in the probe retainer 18. The base 64 has a pair of projections 66a and 66b which project radially outward. These projections 66a and 66b enter and sit in respective inner circumferential grooves 83 (see FIGS. 13A and 13B) formed in the probe retainer 18, thereby interlocking plunger 16 and probe retainer 18 so that they displace vertically in tandem. The flange 70 is disposed inside the spring chamber 35 (previously described with reference to FIG. 7). The spring 36 bears against the flange 70 to exert a spring force which urges the plunger 16 downward. However, if an upward force is exerted on plunger 16 which is sufficient to overcome the spring force, then spring 36 is compressed and the tip of shaft 68 of plunger 16 displaces upward and into the recess 31 seen in FIG. 7.

Figure 13:
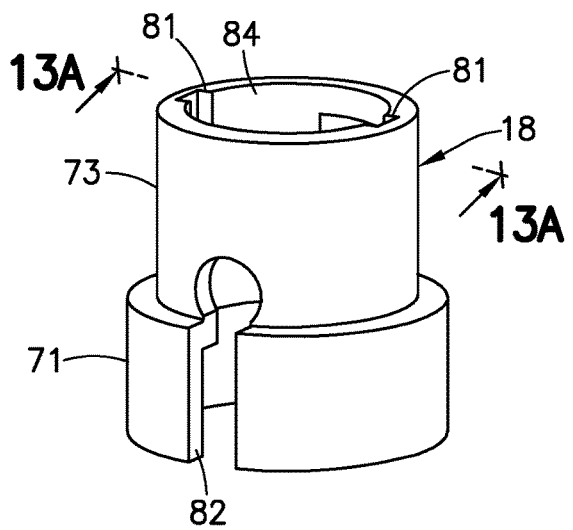
FIG. 13 is a diagram representing a 3-D view of the probe retainer of the plunger/retainer subassembly included in the measurement probe edge guide tool depicted in FIGS. 1-7.

FIG. 13 shows a 3-D view of the probe retainer 18 in accordance with one proposed implementation. The probe retainer 18 comprises sidewalls 71 and 73 having different outer diameters, the outer diameter of sidewall 71 being greater than the outer diameter of sidewall 73. The sidewalls 71 and 73 are connected by an offset. The probe retainer 18 has a slot 82 which extends the entire length of sidewall 71 and part of the length of sidewall 73. The slot 82 provides clearance for a conduit 80 of the measurement probe 32 depicted in FIG. 14 when the probe retainer 18 is slid onto the uppermost portions of the measurement probe 32 during assembly of tool 2.

Figure 13A:
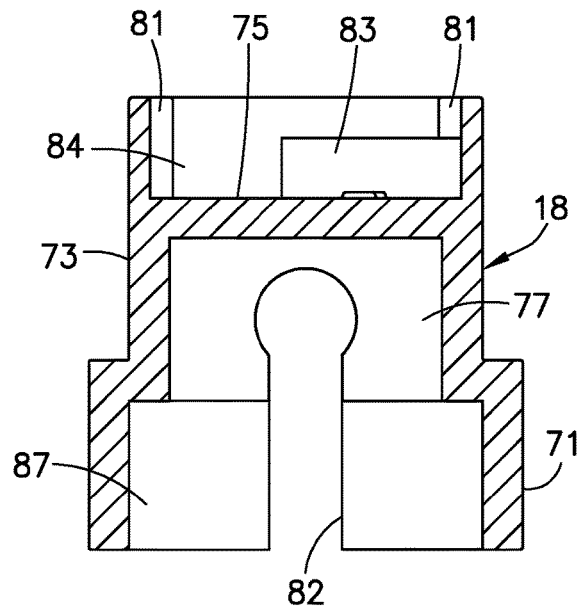
FIG. 13A is a diagram representing a sectional view of the probe retainer depicted in FIG. 13, the section being taken along the plane 13A-13A indicated in FIG. 13.
Figure 13B:
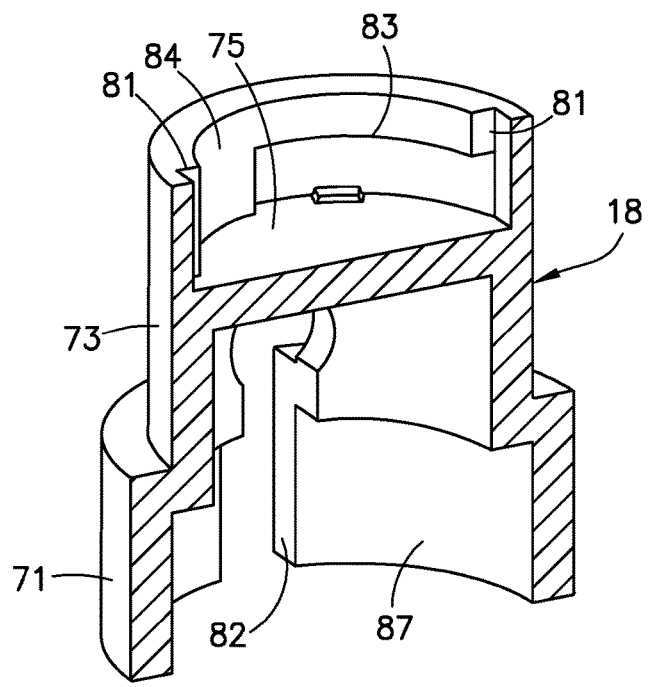
FIG. 13B is a diagram representing a 3-D view of the sectioned probe retainer depicted in FIG. 13A.

FIG. 13A is a diagram representing a sectional view of the probe retainer depicted in FIG. 13, the section being taken along the plane 13A-13A indicated in FIG. 13. FIG. 13B is a diagram representing a 3-D view of the sectioned probe retainer depicted in FIG. 13A. As seen in FIGS. 13A and 13B, the inner surface 77 of sidewall 73 and the inner surface 87 of sidewall 71 form a lower cavity which is configured (sized and shaped) to receive the uppermost portion 37 and mid-portion 39 of measurement probe 32 seen in FIG. 14. The section plane bisects a pair of diametrally opposed vertical grooves 81 which communicate with an upper cavity defined by the inner surface 84 of sidewall 73. The upper cavity is configured to receive the base 64 of plunger 16 seen in FIG. 12. The upper and lower cavities are separated by a floor 75. When the plunger 16 and probe retainer 18 are assembled to form the plunger/retainer subassembly 7, a bottom surface of the base 64 of plunger 16 rests on the upper surface of the floor 75 of probe retainer 18.

The vertical grooves 81 seen in FIGS. 13, 13A, and 13B are configured to receive and guide the projections 66a and 66b projecting from base 64 of plunger 16 seen in FIG. 12. As seen in FIG. 13A, each vertical groove 81 intersects a respective inner circumferential groove 83, which allows the projections 66a and 66b to slide down vertical grooves 81 as plunger 16 is inserted into the upper cavity of probe retainer 18 and then the plunger 16 is twisted so that as base 64 of plunger 16 rotates, the projections 66a and 66b slide into respective inner circumferential grooves 83, thereby interlocking the plunger 16 and probe retainer 18 so that these elements displace vertically in tandem.

Figure 14:
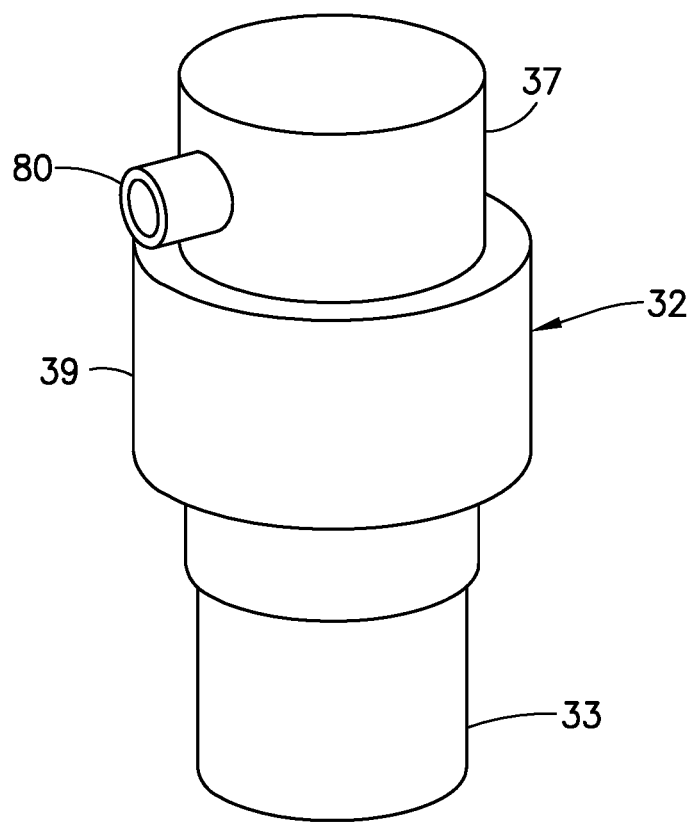
FIG. 14 is a diagram representing a 3-D view of the measurement probe included in the measurement probe edge guide tool depicted in FIGS. 1-7.

FIG. 14 is a diagram representing a 3-D view of the measurement probe 32 included in tool 2. The uppermost portion 37 and mid-portion 39 of measurement probe 32 fit inside the above-described lower cavity of probe retainer 18. The measurement probe 32 is configured to measure (e.g., detect) a property (e.g., an anomaly) of a workpiece or part. A conduit 80 extends radially outward from the uppermost portion 37 of measurement probe 32. An umbilical cable (not shown in the drawings) is passed through conduit 80 to connect the probe to sources of electric power or liquid couplant. For example, in cases where the measurement probe 32 is an ultrasonic transducer, the umbilical cable may include electrical wires for receiving electrical pulses from and returning ultrasonic inspection data signals to an external device and a hose for supplying water to water columns inside the probe, which water acoustically couples the transducer to the structure being interrogated. In cases where measurement probe 32 is an ultrasonic transducer, the contact portion 33 is a delay line.

Figure 15:
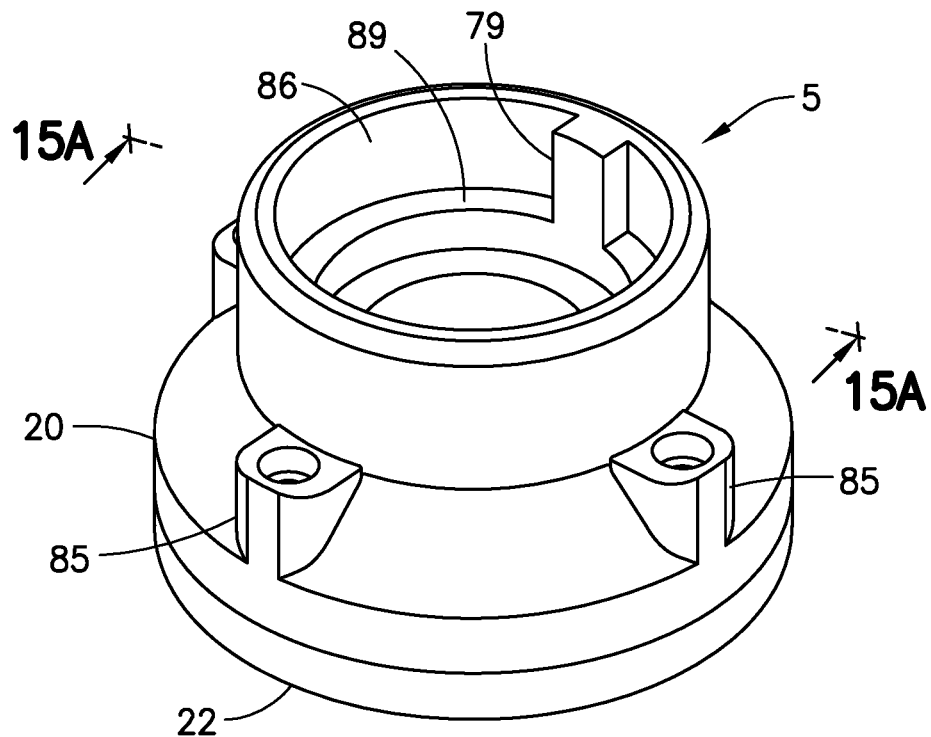
FIG. 15 is a diagram representing a 3-D view of the bearing adapter included in the measurement probe edge guide tool depicted in FIGS. 1-7.
Figure 15A:
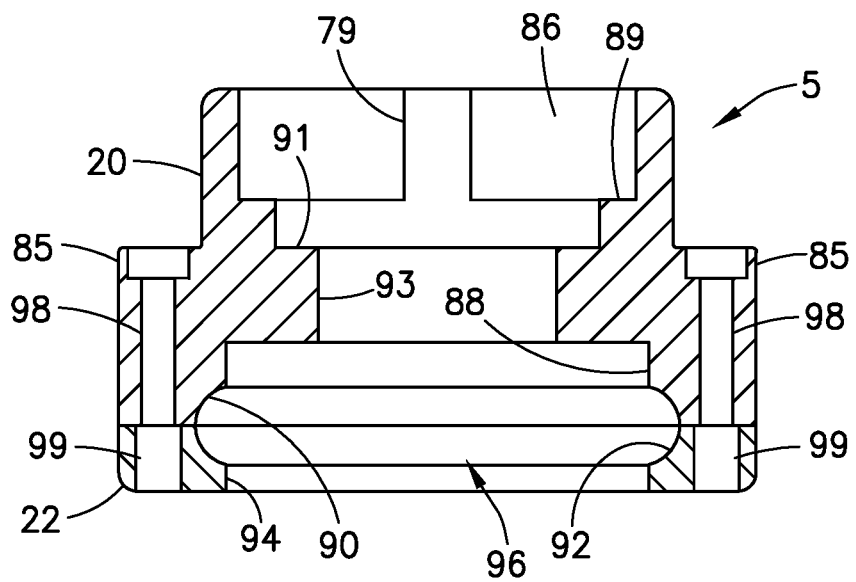
FIG. 15A is a diagram representing a sectional view of the bearing adapter depicted in FIG. 15, the section being taken along the plane 15A-15A indicated in FIG. 15.

FIG. 15 shows a 3-D view of the bearing adapter 5 included in tool 2 depicted in FIGS. 1-7. FIG. 15A is a diagram representing a sectional view of the bearing adapter 5 depicted in FIG. 15, the section being taken along the plane 15A-15A indicated in FIG. 15. The bearing adapter 5 includes an upper bearing adapter part 20 and a lower bearing adapter part 22, both made of plastic material. The upper bearing adapter part 20 is affixed to the cage 4. The lower bearing adapter part 20 is fastened to upper bearing adapter part 20 by means of fasteners not shown in FIG. 15A. Instead, FIG. 15A shows throughholes 98 which extend vertically through the upper bearing adapter part 20 at bosses 85 and throughholes 99 which extend vertically through the lower bearing adapter part 22. Heat-set threaded inserts may be installed in throughholes 99 of lower bearing adapter part 22 prior to assembly. To assemble the bearing adapter 5, the lower bearing adapter part 22 is aligned underneath the upper bearing adapter part 20 and then bolts are passed through throughholes 98 and threadably coupled to the threaded inserts.

The upper bearing adapter part 20 has a cavity which is configured to receive sidewall 71 of probe retainer 18 and mid-portion 39 of measurement probe 32. More specifically, the inner surface 86 of upper bearing adapter part 20 surrounds sidewall 71 of probe retainer 18 while a first ledge 89 provides a seat for probe retainer 18. In addition, the inner surface 93 of upper bearing adapter part 20 surrounds mid-portion 39 of measurement probe 32 while a second ledge 91 provides a seat for measurement probe 32 in the fully extended position where contact portion 33 protrudes as seen in FIGS. 2 and 7. The upper bearing adapter part 20 also includes a vertical projection 79 which projects radially inward from inner surface 86 and extends upward from the first ledge 89. The vertical projection 79 fits inside the slot 82 of probe retainer 18, which slot is seen in FIG. 13.

Figure 16:
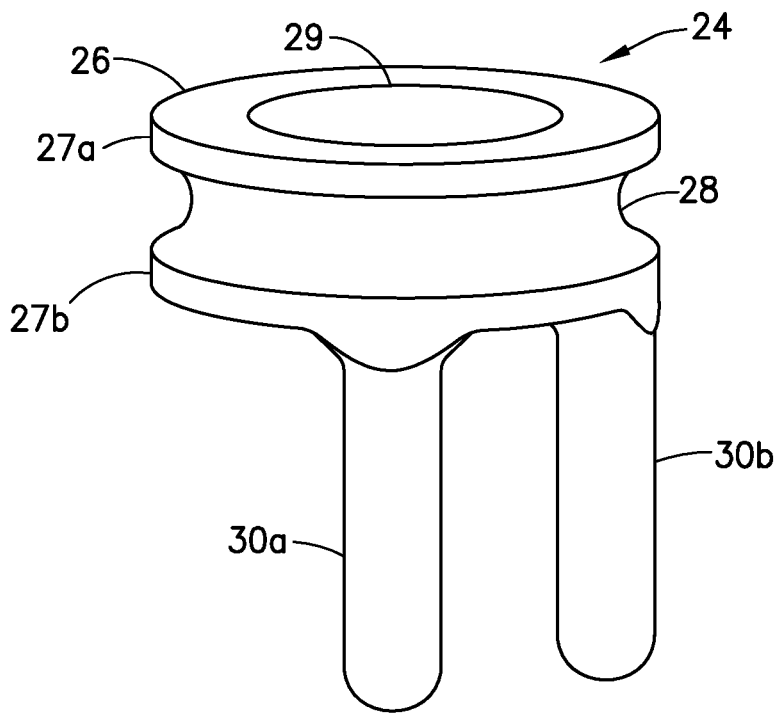
FIG. 16 is a diagram representing a 3-D view of the edge follower included in the measurement probe edge guide tool depicted in FIGS. 1-7.

When assembled as shown in FIG. 15A, the two parts of bearing adapter 5 form an outer race of a ball bearing. More specifically, the upper bearing adapter part 20 has a circumferential surface 90 that forms the upper half of an inner circumferential circular groove, whereas the lower bearing adapter part 20 has a circumferential surface 92 that forms the lower half of the inner circumferential circular groove. In addition, the upper bearing adapter part 20 has a circular cylindrical surface 88 that defines a space that receives an upper flange 27a of the inner race 26 of edge follower 24 shown in FIG. 16, while the lower bearing adapter part 22 has a circular cylindrical surface 94 that defines a space that receives a lower flange 27b of the inner race 26 of edge follower 24. As shown in FIG. 16, the inner race 26 has a central opening 29 (which receives the contact portion 33 of measurement probe 32) and an outer circumferential circular groove 28 (which is surrounded by the inner circumferential circular groove formed by circumferential surfaces 90 and 92).

Figure 15B:
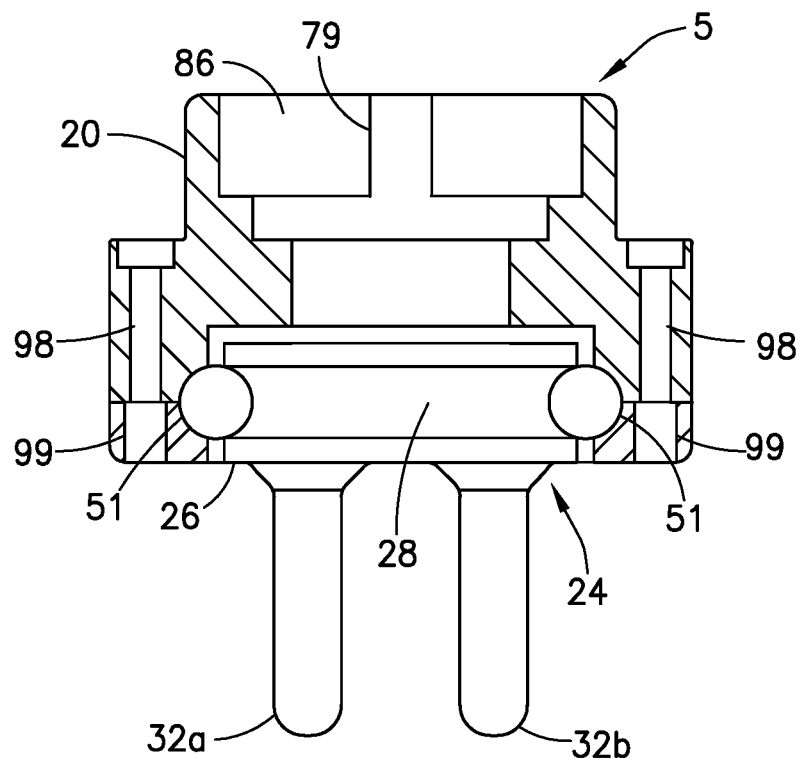
FIG. 15B is a diagram showing a sectional view of the bearing adapter and a side view of the edge follower included in the measurement probe edge guide tool depicted in FIGS. 1-7.

FIG. 15B is a diagram showing a sectional view of the bearing adapter 5 and a side view of the edge follower 24 in an assembled state. A plurality of balls 51 are contained by the inner race 26 of edge follower 24 and the outer race of bearing adapter 5. Thus, the edge follower 24 is able to rotate freely about tool axis 1 (seen in FIG. 7). This free rotation allows the edge contact pins 30a and 30b to stay in contact with the edge of a workpiece or part being measured (e.g., non-destructively inspected) as depicted in FIG. 17.

FIG. 17 is a diagram representing a 3-D view of a measurement probe edge guide tool 2 having two edge contact pins 30a and 30b in contact with the edge 102 of a workpiece 100 while a major portion of the rolling cage assembly 3 is seated on the surface 104 of workpiece 100 and a minor portion of the rolling cage assembly 3 projects beyond the edge 102 of the workpiece 100. After both edge contact pins 30a and 30b have been placed in contact with edge 102, the technician can manipulate the handle 6 to cause the measurement probe 32 to move along a marginal portion of surface 104 which is bounded by edge 102. As the tool 2 travels over the marginal portion of surface 104, the technician maintains the edge contact pins 30a and 30b in contact with the edge 102, which has the effect of maintaining the center of the measurement probe at a consistent distance from the edge 102.

Figure 18:
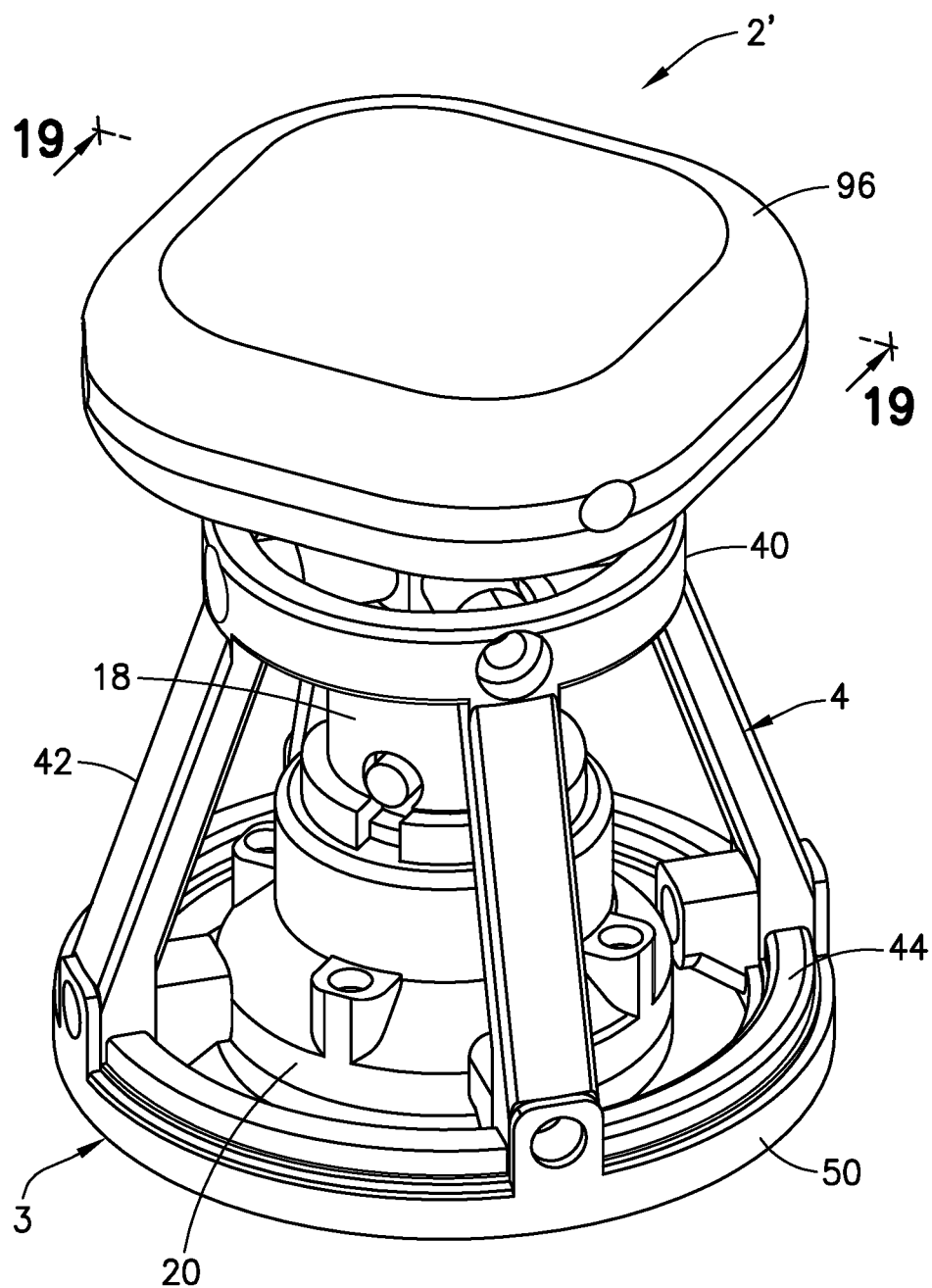
FIG. 18 is a diagram representing a 3-D view of a measurement probe edge guide tool equipped with a hand grip in accordance with another embodiment.

FIG. 18 is a diagram representing a 3-D view of a measurement probe edge guide tool 2' in accordance with an alternative embodiment. The measurement probe edge guide tool 2' is identical to tool 2 described above except that a hand grip 96 is substituted in place of the handle 6 and universal joint 8.

Figure 19:
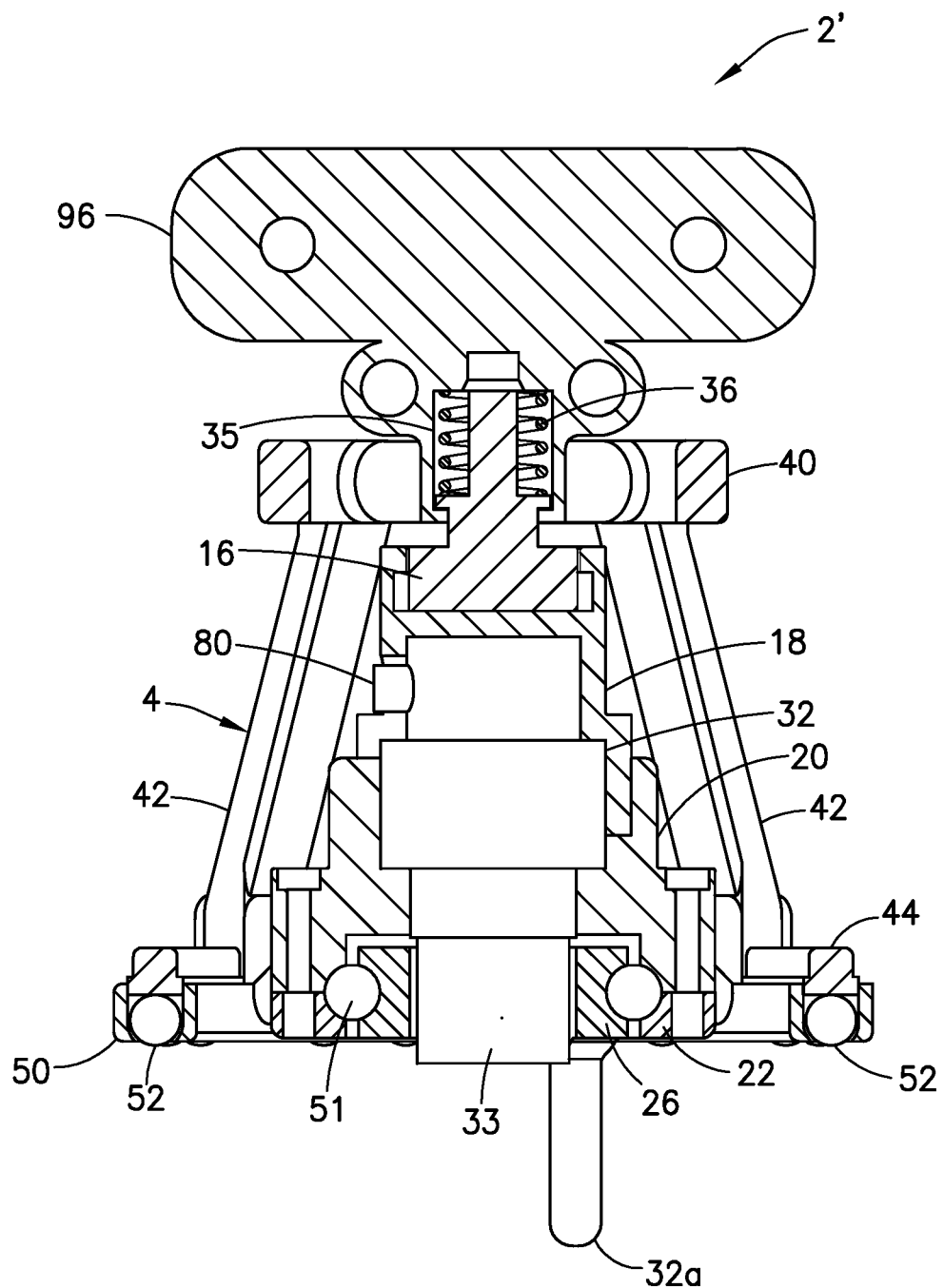
FIG. 19 is a diagram representing a cross-sectional view of the measurement probe edge guide tool depicted in FIG. 18, the section being taken along the plane 19-19 indicated in FIG. 18, with the exception of the measurement probe which is not sectioned.

FIG. 19 is a diagram representing a cross-sectional view of the measurement probe edge guide tool depicted in FIG. 18, the section being taken along the plane 19-19 indicated in FIG. 18, with the exception of the measurement probe 32 which is not sectioned. Instead of the spring chamber 35 being incorporated in the universal joint as described above, in measurement probe edge guide tool 2', the spring chamber 35 is incorporated in the lowermost portion of the hand grip 96.

While measurement probe edge guide tools have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the terms "upper", "higher", "downward", and "lower" refer to vertical positions of a tool component relative to a tool vertical axis which is oriented normal to a horizontal planar surface when the tool is placed on that horizontal planar surface. As used in the claims, the phrase "connected to" should be construed broadly to encompass "attached to" and "integrally formed with".

The invention claimed is:

1. A tool comprising:
   a cage comprising upper and lower parts and interconnecting structure that connects the upper parts to the lower parts;
   a measurement probe configured to measure a property of a workpiece or part;
   a probe retainer configured to retain the measurement probe in a vertical orientation, the probe retainer being translatable relative to the cage in directions parallel to a tool vertical axis; and
   an edge follower that is rotatable relative to the cage about the tool vertical axis, wherein the edge follower comprises:
   a ring that encircles a portion of the measurement probe; and
   first and second edge contact pins that are connected to and project downward from the ring.

2. The tool as recited in claim 1, wherein the first and second edge contact pins have respective longitudinal axes which are parallel to the tool vertical axis.

3. The tool as recited in claim 2, wherein a first hypothetical plane that intersects the longitudinal axis of the first edge contact pin and the tool vertical axis and a second hypothetical plane that intersects the longitudinal axis of the second edge contact pin and the tool vertical axis intersect at a right angle.

4. The tool as recited in claim 1, wherein the upper part of the cage comprises an upper ring, the lower part of the cage comprises a lower ring, and the interconnecting structure of the cage comprises a plurality of beams connecting the upper ring to the lower ring.

5. The tool as recited in claim 1, further comprising:
   a socket ring affixed to the cage and comprising a plurality of sockets; and
   a plurality of balls respectively disposed in and protruding from the plurality of sockets.

6. The tool as recited in claim 1, wherein the measurement probe comprises:
   an ultrasonic transducer which is activatable to transmit ultrasound; and
   a delay line disposed lower than and acoustically coupled to the ultrasonic transducer when the ultrasonic transducer is activated,
   wherein the ring of the edge follower encircles the delay line.

7. The tool as recited in claim 1, wherein the ring of the edge follower comprises an inner race having an outer circumferential circular groove, the tool further comprising:
a bearing adapter that is affixed to the cage and comprises an inner circumferential circular groove; and
a plurality of rolling elements contained by the inner and outer circumferential circular grooves.

8. The tool as recited in claim 1, further comprising:
a universal joint comprising a U-joint hub having first and second axes, a first U-joint yoke rotatably coupled to the U-joint hub for rotation about the first axis, and a second U-joint yoke rotatably coupled to the U-joint hub for rotation about the second axis, wherein the second U-joint yoke is affixed to the upper part of the cage; and
a handle affixed to the first U-joint yoke.

9. The tool as recited in claim 8, further comprising:
a plunger that is coupled to move in tandem with the probe retainer; and
a spring arranged to urge the plunger to displace downward,
wherein the second U-joint yoke comprises a body portion having a spring chamber which is partly occupied by a portion of the plunger and the spring.

10. The tool as recited in claim 1, further comprising a hand grip affixed to the upper part of the cage.

11. A tool comprising:
a cage comprising an upper ring, a lower ring, and a plurality of beams connecting the upper ring to the lower ring;
a socket ring affixed to the cage and comprising a plurality of sockets;
a plurality of balls respectively arranged in the plurality of sockets and protruding below a plane of a bottom surface of the socket ring;
a measurement probe having a contact portion;
a plunger/retainer subassembly that retains the measurement probe in a central position relative to the cage, the plunger/retainer subassembly being upwardly displaceable relative to the cage from a starting position at which the contact portion of the measurement probe projects downward and lower than the cage;
a rolling-element bearing comprising inner and outer races and a plurality of rolling elements contained by the inner and outer races, the inner and outer races being disposed between the measurement probe and the lower ring of the cage, the outer race being fixed, and the inner race being rotatable relative to the cage; and
first and second edge contact pins that are connected to and project downward from the inner race.

12. The tool as recited in claim 11, wherein the measurement probe comprises:
an ultrasonic transducer which is activatable to transmit ultrasound; and
a delay line disposed lower than the ultrasonic transducer and encircled by the inner race.

13. The tool as recited in claim 11, wherein the rolling elements are balls.

14. The tool as recited in claim 11, further comprising:
a universal joint comprising a U-joint hub having first and second axes, a first U-joint yoke rotatably coupled to the U-joint hub for rotation about the first axis, and a second U-joint yoke rotatably coupled to the U-joint hub for rotation about the second axis, wherein the second U-joint yoke is affixed to the upper ring of the cage; and
a handle affixed to the first U-joint yoke.

15. The tool as recited in claim 14, wherein:
the plunger/retainer subassembly comprises a probe retainer that retains the measurement probe and a plunger that is coupled to move in tandem with the probe retainer;
the second U-joint yoke comprises a body portion having a spring chamber; and
the tool further comprises a spring that winds around a portion of the plunger and is disposed inside the spring chamber.

16. The tool as recited in claim 11, further comprising a hand grip affixed to the upper ring of the cage.

17. The tool as recited in claim 16, wherein:
the plunger/retainer subassembly comprises a probe retainer that retains the measurement probe and a plunger that is coupled to move in tandem with the probe retainer;
the hand grip comprises a body portion having a spring chamber; and
the tool further comprises a spring that winds around a portion of the plunger and is disposed inside the spring chamber.

18. A tool comprising:
a cage comprising an upper ring, a lower ring, and a plurality of beams connecting the upper ring to the lower ring;
a socket ring affixed to the cage and comprising a plurality of sockets;
a plurality of balls respectively arranged in the plurality of sockets and protruding below a plane of a bottom surface of the socket ring;
a measurement probe having a contact portion; and
a plunger/retainer subassembly that retains the measurement probe in a central position relative to the cage, the plunger/retainer subassembly being displaceable relative to the cage from a starting position at which the contact portion of the measurement probe projects downward and lower than the cage.

19. The tool as recited in claim 18, wherein the measurement probe comprises:
an ultrasonic transducer which is activatable to transmit ultrasound; and
a delay line disposed lower than the ultrasonic transducer.

20. The tool as recited in claim 18, further comprising:
a universal joint comprising a U-joint hub having first and second axes, a first U-joint yoke rotatably coupled to the U-joint hub for rotation about the first axis, and a second U-joint yoke rotatably coupled to the U-joint hub for rotation about the second axis, wherein the second U-joint yoke is affixed to the upper ring of the cage; and
a handle affixed to the first U-joint yoke.

* * * * *